United States Patent
Bai et al.

(10) Patent No.: US 11,476,742 B1
(45) Date of Patent: Oct. 18, 2022

(54) MULTI-DEGREE-OF-FREEDOM SPHERICAL MOTOR

(71) Applicant: HUAZHONG UNIVERSITY OF SCIENCE AND TECHNOLOGY, Hubei (CN)

(72) Inventors: Kun Bai, Hubei (CN); Mengke Li, Hubei (CN); Zixin Que, Hubei (CN); Yaowu Ding, Hubei (CN); Xiyin Li, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 17/379,971

(22) Filed: Jul. 19, 2021

(30) Foreign Application Priority Data

Apr. 23, 2021 (CN) .......................... 202110443746.X

(51) Int. Cl.
*H02K 16/02* (2006.01)

(52) U.S. Cl.
CPC ......... *H02K 16/02* (2013.01); *H02K 2201/18* (2013.01)

(58) Field of Classification Search
CPC ........................... H02K 16/02; H02K 2201/28
See application file for complete search history.

(56) References Cited

U.S. PATENT DOCUMENTS

2009/0230787 A1* 9/2009 Won .................. H02K 41/03
310/38

FOREIGN PATENT DOCUMENTS

| CN | 108462346 A | * | 8/2018 | ........... H02K 1/2773 |
| CN | 110492638 A | * | 11/2019 | ............... H02K 1/12 |
| CN | 111604935 A | * | 9/2020 | ............. B25J 17/00 |
| EP | 3726711 A1 | * | 10/2020 | |
| WO | WO-2011024470 A2 | * | 3/2011 | ............... F04D 1/00 |

* cited by examiner

*Primary Examiner* — Naishadh N Desai
(74) *Attorney, Agent, or Firm* — JCIP Global Inc.

(57) ABSTRACT

A multi-degree-of-freedom spherical motor includes a primary frame, a secondary frame, a tertiary frame, a terminal rotor, a first rotating shaft, a second rotating shaft, a third rotating shaft, permanent magnets and electromagnetic coils. The electromagnetic coils are arranged on an inner surface of the primary frame. Two sides at a top portion of the primary frame are symmetrically connected to the secondary frame through the first rotating shaft. The tertiary frame is arranged inside the secondary frame in a non-mechanical contact manner. The terminal rotor and the tertiary frame are connected through the third rotating shaft. The permanent magnets are arranged on one side of the terminal rotor close to the primary frame. The secondary frame and the tertiary frame are connected through the second rotating shaft. The first rotating shaft, the second rotating shaft and the third rotating shaft are perpendicular to each other.

9 Claims, 1 Drawing Sheet

MULTI-DEGREE-OF-FREEDOM SPHERICAL MOTOR

CROSS-REFERENCE TO RELATED APPLICATION

This application claims the priority benefit of China application serial no. 202110443746.X, filed on Apr. 23, 2021. The entirety of the above-mentioned patent application is hereby incorporated by reference herein and made a part of this specification.

BACKGROUND

Field of the Disclosure

The disclosure belongs to the field of motion systems and robots, and more specifically, relates to a multi-degree-of-freedom spherical motor.

Description of Related Art

In the fields of aviation, military, industrial automation, smart robots and so on, if it is desired to perform multi-degree-of-freedom (MDOF) motion, such as the motion of MDOF robots, and the motion of multi-axis computer numerical control (CNC) machine tool processing platforms, the only way to achieve the above purpose is to perform mechanical combination such as connecting multiple single-degree-of-freedom (SDOF) motors in series or in parallel through a complicated connection mechanism. When driving, each SDOF motor needs to be individually controlled to achieve the overall MDOF rotation. However, in this conventional driving system, the accumulation of control errors of multiple SDOF motors will lead to a decrease in the accuracy of the entire control system, and will also affect the stability of the system to a certain extent. In addition, this kind of driving system typically has a very complex structure, which has poor dynamic performance. Accordingly, not only the overall size of the motor is increased, but also a serious coupling effect is generated, such that great difficulty is brought to the control of the motor, and it is difficult to realize fast and accurate control on terminal attitude.

The development of existing MDOF motor solves the above problems, but the existing MDOF motor can only perform self-rotation or rotation. In the fields of automated factories or robot control, it is often required for a single motor to achieve MDOF motion, such as complex motions including self-rotation, deflection, and linear movement, so as to simplify the system structure and improve the steady-state performance of the system. Therefore, it is highly essential to provide an MDOF motor with simple structure, small size, low power consumption, quick response, and easy to realize accurate MDOF position control.

SUMMARY OF THE DISCLOSURE

In view of the shortcomings of the known technologies, the purpose of the disclosure is to provide a multi-degree-of-freedom spherical motor, which aims to solve the problem that multiple motors cannot be synchronously controlled when multiple single-axis motors are adopted to drive the motion system to perform the overall multi-degree-of-freedom rotary motion. The above problem causes that the accuracy of controlling on the terminal position of the motion system is poor.

To achieve the above purpose, the disclosure provides a multi-degree-of-freedom spherical motor, which includes a primary frame, a secondary frame, a tertiary frame, a terminal rotor, a first rotating shaft, a second rotating shaft, a third rotating shaft, permanent magnets and electromagnetic coils. Electromagnetic coils are arranged on an inner surface of the primary frame. Two sides of the primary frame are symmetrically connected to the secondary frame through the first rotating shaft. The tertiary frame is arranged on an inner side of the secondary frame through the second rotating shaft. The terminal rotor and the tertiary frame are connected through the third rotating shaft. Both the tertiary frame and the primary frame are axisymmetric about the terminal rotor. Permanent magnets are arranged on one side of the terminal rotor close to the primary frame. The first rotating shaft, the second rotating shaft and the third rotating shaft are perpendicular to each other, and an intersection of the first rotating shaft, the second rotating shaft and the third rotating shaft is on a symmetry axis or an extension line of the terminal rotor. The intersection is a rotation center. The primary frame acts as a stator. During operation, current is applied to the electromagnetic coils, and electromagnetic force is generated between the electromagnetic coils and the permanent magnets. Under an action of the electromagnetic force, rotation of the terminal rotor on an axis of the first rotating shaft, an axis of the second rotating shaft, and an axis of the third rotating shaft in three mutually perpendicular directions can be realized.

Preferably, the inner surface of the primary frame and an outer surface of the terminal rotor have a spherical structure to facilitate the symmetrical arrangement of the permanent magnets and the electromagnetic coils.

Preferably, the electromagnetic coils are evenly distributed in the primary frame instead of a surface of the terminal rotor, which can avoid the wires of the electromagnetic coils from winding during the rotation.

Preferably, the electromagnetic coils and the permanent magnets are evenly distributed on the inner surface of the primary frame and a surface of the terminal rotor on one side close to the primary frame. Each of the electromagnetic coils has an equal distance from the rotation center, and each of the permanent magnets has an equal distance from the rotation center, which facilitates the calculation of the driving current.

Preferably, axes of both the electromagnetic coils and axes of the permanent magnets pass through the rotation center, which facilitates the calculation of the driving current.

Preferably, the axes of the electromagnetic coil and the axes of the permanent magnet do not overlap each other at an initial position, which can avoid excessive required driving current when the multi-degree-of-freedom spherical motor starts at an initial position.

Generally speaking, compared with the known technologies, the above technical solutions provided by the disclosure have the following advantageous effects.

In the disclosure, through the use of a three-degree-of-freedom rotating structure with multiple frames and spherically-distributed electromagnetic units (electromagnetic coils and permanent magnets), and through the interaction between multiple permanent magnets and electromagnetic coils, the end of the rotor (the terminal rotor and the output shaft) is directly driven to realize control of multi-degree-of-freedom rotation. Compared with the conventional rotating system, the structure with the driving mode in the disclosure is simpler and more compact, and easy to realize fast and accurate position control of multi-degree-of-freedom. The frame structure of the multi-degree-of-freedom is easy to manufacture, and the distributed electromagnetic units can realize the overall synchronous control of the multi-degree-of-freedom, such that the problem of poor control accuracy caused by asynchronization of multiple motors can be solved in the conventional system.

DESCRIPTION OF EMBODIMENTS

In order to make the purpose, technical solutions, and advantages of the present disclosure clearer, the disclosure is further described in detail below with reference to the accompanying drawings and embodiments. It should be understood that the specific embodiments described here are only used to explain the disclosure, but not to limit the disclosure.

Embodiment

Figure 1:
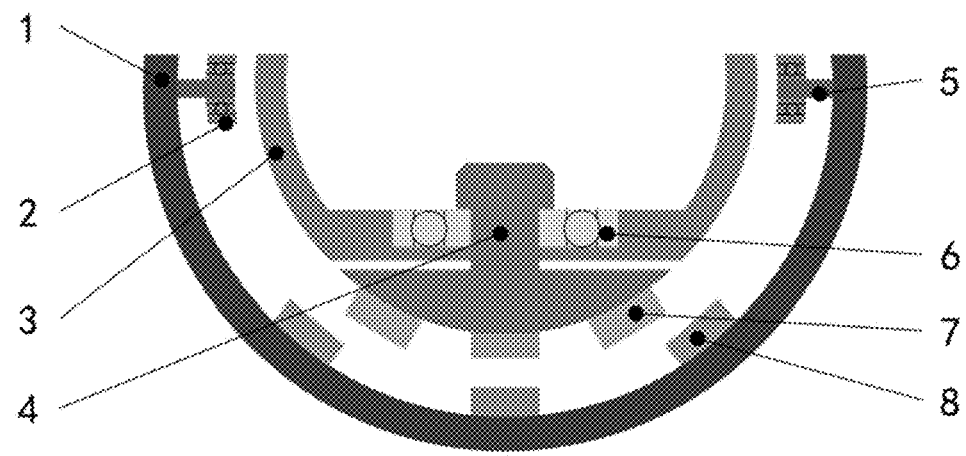
FIG. 1 is a cross-sectional view of a multi-degree-of-freedom spherical motor of an embodiment of the disclosure.

FIG. 1 is a cross-sectional view of a multi-degree-of-freedom spherical motor. As shown in FIG. 1, the rotating system of the spherical motor includes a multi-stage rotating frame and a terminal rotor 4. The inner surface of the primary frame 1 and the outer surface of the terminal rotor 4 of the rotating system are spherical structures. The inner surface of the primary frame 1 of the rotating system is provided with electromagnetic coils 8. In the rotating system, both sides of the primary frame 1 are symmetrically connected to the secondary frame 2 of the rotating system through the first rotating shaft 5. The tertiary frame 3 of the rotor system is arranged at the inner side of the secondary frame 2 of the rotating system through the second rotating shaft 9. The terminal rotor 4 and the tertiary frame 3 of the rotor system are connected through the third rotating shaft 6. The tertiary frame 3 of the rotor system and the primary frame 1 of the rotating system are axisymmetric about the terminal rotor 4. The permanent magnets 7 are arranged on one side of the terminal rotor 4 close to the primary frame 1 of the rotating system. The first rotation axis 5, the second rotation axis 9 and the third rotation axis 6 are perpendicular to each other, and the intersection of the first rotation axis 5, the second rotation axis 9 and the third rotation axis 6 is the rotation center, and is located on the symmetry axis or the extension line of the terminal rotor 4. In actual application, the terminal rotor 4 serves as a working platform or combined with an output shaft to cooperatively form a working platform.

Specifically, each of the frames is connected through rotating shafts that mutually perpendicular to each other, and the extension lines of the symmetrical axes of the rotating shafts intersect at the center of the sphere, so as to ensure that the terminal rotor 4 can rotate in three degrees of freedom relative to the outermost primary frame 1. In addition, the primary frame 1 and the terminal rotor 4 of the rotating system are respectively provided with the electromagnetic coils 8 and the permanent magnets 7. The central axes of the electromagnetic coils 8 point to the center of the sphere. During operation, when a certain current is applied to the electromagnetic coils 8, through the electromagnetic force between the electromagnetic coils 8 on the primary frame 1 of the rotating system and the permanent magnets 7 on the terminal rotor 4, the permanent magnets 7 on the terminal rotor is subjected to a certain electromagnetic torque. Because the permanent magnets 7 are fixedly connected to the terminal rotor 4, the terminal rotor 4 will be subjected to a certain torque. Moreover, because the terminal rotor 4 can only rotate along the axis of the first rotating shaft 5, the axis of the second rotating shaft 9 and the axis of the third rotating shaft 6, the terminal rotor 4 can perform rotation in the direction of three mutually perpendicular degrees of freedom around the center of the sphere, under the action of electromagnetic torque. That is, it is possible to realize a certain rotation of the rotor of the spherical motor rotating system relative to the frame.

The connection relationship between the frames and the rotating shafts is as follows. The terminal rotor 4 and the tertiary frame 3 of the rotor system are connected through the third rotating shaft 6. The secondary frame 2 of the rotating system and the tertiary frame 3 of the rotor system are connected through the second rotating shaft 9. The two sides at the top portion of the primary frame 1 of the rotating system are symmetrically connected to the secondary frame 2 of the rotating system through the first rotating shaft 5.

Figure 2:
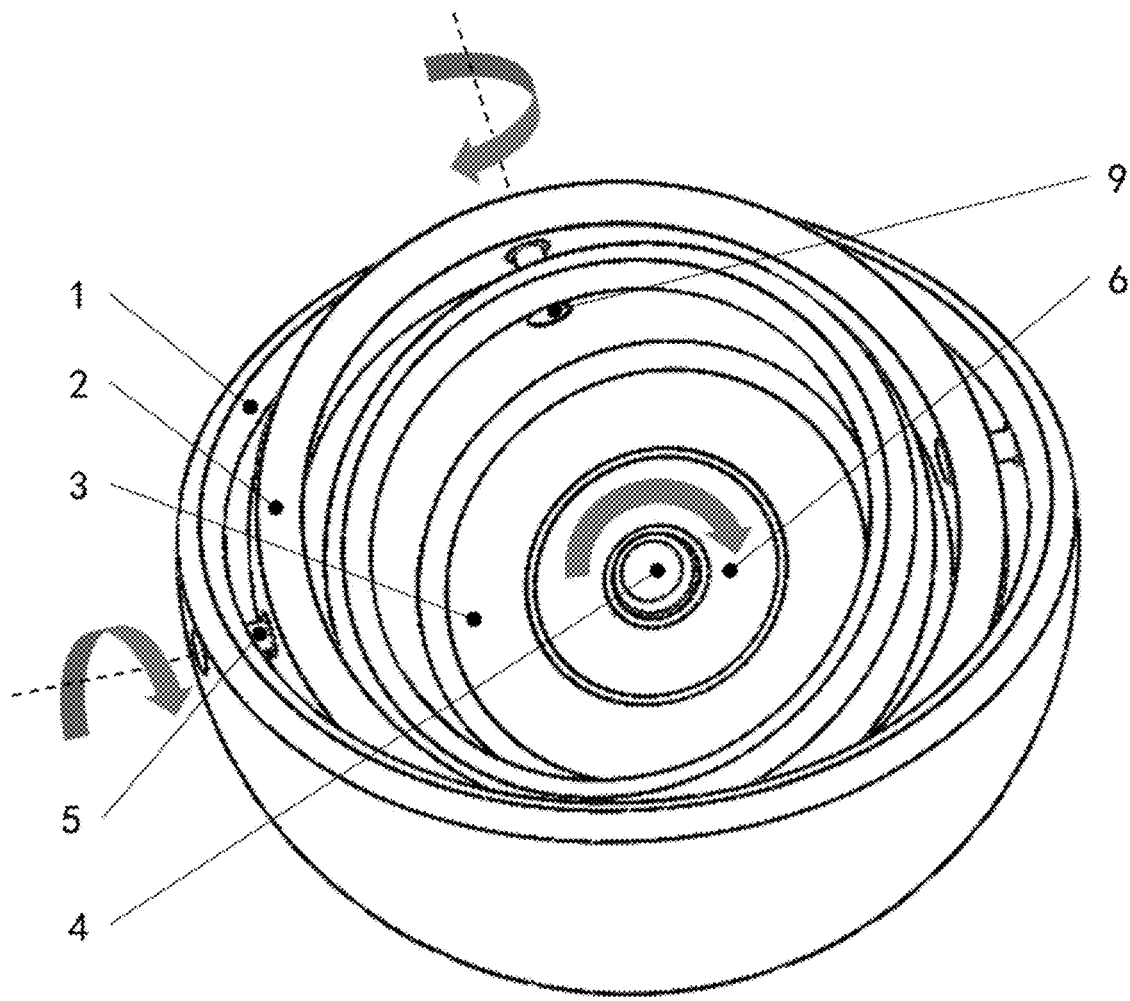
FIG. 2 is a schematic view of the multi-degree-of-freedom spherical motor of an embodiment of the disclosure.

FIG. 2 is a schematic view of the appearance of the multi-degree-of-freedom spherical motor. As shown in FIG. 2, the terminal rotor 4 of the rotating system can rotate in three different directions relative to the primary frame 1 of the outermost rotating system. The axes of the three rotating directions, respectively, are the axis of the first rotating shaft 5, the axis of the second rotating shaft 9, and the axis of the third rotating shaft 6, and the three axes are perpendicular to each other and intersect at the center of the sphere. That is, compared to a conventional rotating system composed of multiple single-degree-of-freedom connected in series, this three-degree-of-freedom spherical rotating structure with multiple frames has a simplified mechanism in terms of overall structure, so that the rotating system can be controlled by directly-drive manner to realize rotation in three-degree-of-freedom.

Those skilled in the art can easily understand that the above are only preferred embodiments of the present disclosure and are not intended to limit the present disclosure. Any modification, equivalent replacement and improvement, etc., made within the spirit and principle of the present disclosure should fall within the scope sought to be protected by the present disclosure.

What is claimed is:

1. A multi-degree-of-freedom spherical motor, comprising: a primary frame, a secondary frame, a tertiary frame, a terminal rotor, a first rotating shaft, a second rotating shaft, a third rotating shaft, permanent magnets, and electromagnetic coils;

wherein the electromagnetic coils are arranged on an inner surface of the primary frame; two sides of the primary frame are symmetrically connected to the secondary frame through the first rotating shaft; the tertiary frame is arranged on an inner side of the secondary frame through the second rotating shaft; the terminal rotor and the tertiary frame are connected through the third rotating shaft; the tertiary frame and the primary frame are axisymmetric about the terminal rotor; the permanent magnets are arranged on one side of the terminal rotor close to the primary frame; the first rotating shaft, the second rotating shaft and the third rotating shaft are perpendicular to each other, and an intersection of the first rotating shaft, the second rotating shaft and the third rotating shaft is a rotation center and is located on a symmetry axis or an extension line of the terminal rotor;

the primary frame acts as a stator; during operation, a current is applied to the electromagnetic coils, and an electromagnetic force is generated between the electromagnetic coils and the permanent magnets; under an action of the electromagnetic force, the terminal rotor realizes rotation on an axis of the first rotating shaft, an axis of the second rotating shaft and an axis of the third rotating shaft, and the axis of the first rotating shaft, the axis of the second rotating shaft and the axis of the third rotating shaft are in three mutually perpendicular directions.

2. The multi-degree-of-freedom spherical motor according to claim 1, wherein the inner surface of the primary frame and an outer surface of the terminal rotor are spherical structures.

3. The multi-degree-of-freedom spherical motor according to claim 1, wherein the electromagnetic coils are evenly distributed on the inner surface of the primary frame, and each of the electromagnetic coils has an equal distance from the rotation center.

4. The multi-degree-of-freedom spherical motor according to claim 1, wherein the permanent magnets are evenly distributed on a surface of the terminal rotor close to the primary frame, and each of the permanent magnets has an equal distance from the rotation center.

5. The multi-degree-of-freedom spherical motor according to claim 4, wherein axes of the electromagnetic coils and axes of the permanent magnets pass through the rotation center.

6. The multi-degree-of-freedom spherical motor according to claim 1, wherein axes of the electromagnetic coils and axes of the permanent magnets do not overlap each other at an initial position.

7. The multi-degree-of-freedom spherical motor according to claim 3, wherein axes of the electromagnetic coils and axes of the permanent magnets pass through the rotation center.

8. The multi-degree-of-freedom spherical motor according to claim 2, wherein axes of the electromagnetic coils and axes of the permanent magnets pass through the rotation center.

9. The multi-degree-of-freedom spherical motor according to claim 1, wherein axes of the electromagnetic coils and axes of the permanent magnets pass through the rotation center.

* * * * *